US007123990B2

(12) United States Patent
Thelen

(10) Patent No.: US 7,123,990 B2
(45) Date of Patent: Oct. 17, 2006

(54) GAP WELDING PROCESS

(75) Inventor: Richard L. Thelen, Eau Claire, WI (US)

(73) Assignee: Holland L.P., Crete, IL (US)

(*) Notice: Subject to any disclaimer, the term of this patent is extended or adjusted under 35 U.S.C. 154(b) by 133 days.

(21) Appl. No.: 10/297,000

(22) PCT Filed: Jun. 1, 2001

(86) PCT No.: PCT/US01/17702

§ 371 (c)(1),
(2), (4) Date: May 9, 2003

(87) PCT Pub. No.: WO01/95132

PCT Pub. Date: Dec. 13, 2001

(65) Prior Publication Data

US 2004/0010342 A1 Jan. 15, 2004

Related U.S. Application Data

(60) Provisional application No. 60/209,040, filed on Jun. 2, 2000.

(51) Int. Cl.
*G06F 19/00* (2006.01)

(52) U.S. Cl. .................... 700/245; 700/246; 700/250; 700/252; 700/257; 700/258; 700/262; 700/264; 219/54; 219/214.34; 219/125.1; 901/42; 701/23

(58) Field of Classification Search ........... 700/245, 700/246, 250, 252, 253, 257, 258, 262, 264; 219/54, 124.34, 125.1; 901/42; 701/23
See application file for complete search history.

(56) References Cited

U.S. PATENT DOCUMENTS 4,338,672 A * 7/1982 Perzley et al. .............. 700/249

(Continued)

FOREIGN PATENT DOCUMENTS

CA 2312364 12/1998

(Continued)

OTHER PUBLICATIONS

Sharif et al., Intelligent cooperative control system, 2001, IEEE, pp. 439-443.*
Smith et al., A vision-based seam tracker for butt-plate TIG welding, 1989, Internet, pp. 739-477.*

*Primary Examiner*—Thomas Black
*Assistant Examiner*—McDieunel Marc
(74) *Attorney, Agent, or Firm*—David C. Brezina; Barnes & Thornburn LLP

(57) ABSTRACT

A gap welding process (10) for manipulating a movable robotic welder (30) for making a weld between two or more substantially immovable work pieces (51) using a higher level programming language (20). The gap welding process (10) performs a data transfer routine which takes spreadsheet data (18) representing expected variables, runs a data conversion program (20) that creates weld program data including point position, user frames (34 and 36), weld schedule, seam tracking schedule, weave schedule, azimuth orientation, travel speed, wait time, weave type and number of digital output control data. The gap welding process (10) also performs a gap-sensing routine (28) for actual weld gap measuring by using the robotic welder (30) to touch specific locations on pieces forming the gap or fixturing to produce weld variance data. The gap welding process (10) then uses a weld control program in conjunction with the weld program data (22), weld variance data (26), and feedback data (44) that is gathered during the welding process to determine and perform the correct manipulation required to produce torch movements to accurately weld the gap (32).

6 Claims, 6 Drawing Sheets

U.S. PATENT DOCUMENTS

| | | | |
|---|---|---|---|
| 4,877,940 A * | 10/1989 | Bangs et al. | 219/124.34 |
| 4,951,218 A | 8/1990 | Okumura et al. | |
| 5,038,292 A | 8/1991 | Okumura et al. | |
| 5,040,124 A | 8/1991 | Okumura et al. | |
| 5,040,125 A | 8/1991 | Okumura et al. | |
| 5,045,668 A | 9/1991 | Neiheisel et al. | |
| 5,064,244 A | 11/1991 | Sproule | |
| 5,079,491 A * | 1/1992 | Nose et al. | 318/568.11 |
| 5,532,452 A * | 7/1996 | Lechner et al. | 219/124.34 |
| 5,605,283 A | 2/1997 | Lahnsteiner et al. | |
| 5,760,365 A | 6/1998 | Milewski et al. | |
| 5,773,779 A | 6/1998 | Morlock | |
| 5,877,468 A | 3/1999 | Morlock | |
| 6,069,333 A | 5/2000 | Morlock | |
| 6,166,347 A | 12/2000 | Morlock | |
| 6,201,216 B1 | 3/2001 | Mumaw | |
| 6,204,469 B1 | 3/2001 | Fields, Jr. et al. | |
| 6,207,920 B1 | 3/2001 | Morlock | |
| 6,261,701 B1 | 7/2001 | Fields, Jr. | |
| 6,278,074 B1 * | 8/2001 | Morlock et al. | 219/54 |
| 6,396,020 B1 | 5/2002 | Thelen et al. | |
| 6,403,918 B1 * | 6/2002 | Fields et al. | 219/121.64 |
| 6,407,364 B1 | 6/2002 | Mumaw | |
| 6,515,249 B1 | 2/2003 | Valley et al. | |
| 2002/0170884 A1 | 11/2002 | Thelen et al. | |
| 2004/0010342 A1 | 1/2004 | Thelen | |

FOREIGN PATENT DOCUMENTS

| | | |
|---|---|---|
| CA | 2411005 | 12/2001 |
| CA | 2413918 | 12/2001 |
| WO | WO/2001-093641 A1 | 12/2001 |
| WO | WO/2001-95132 A1 | 12/2001 |
| WO | WO/2004-014708 A2 | 2/2004 |

* cited by examiner

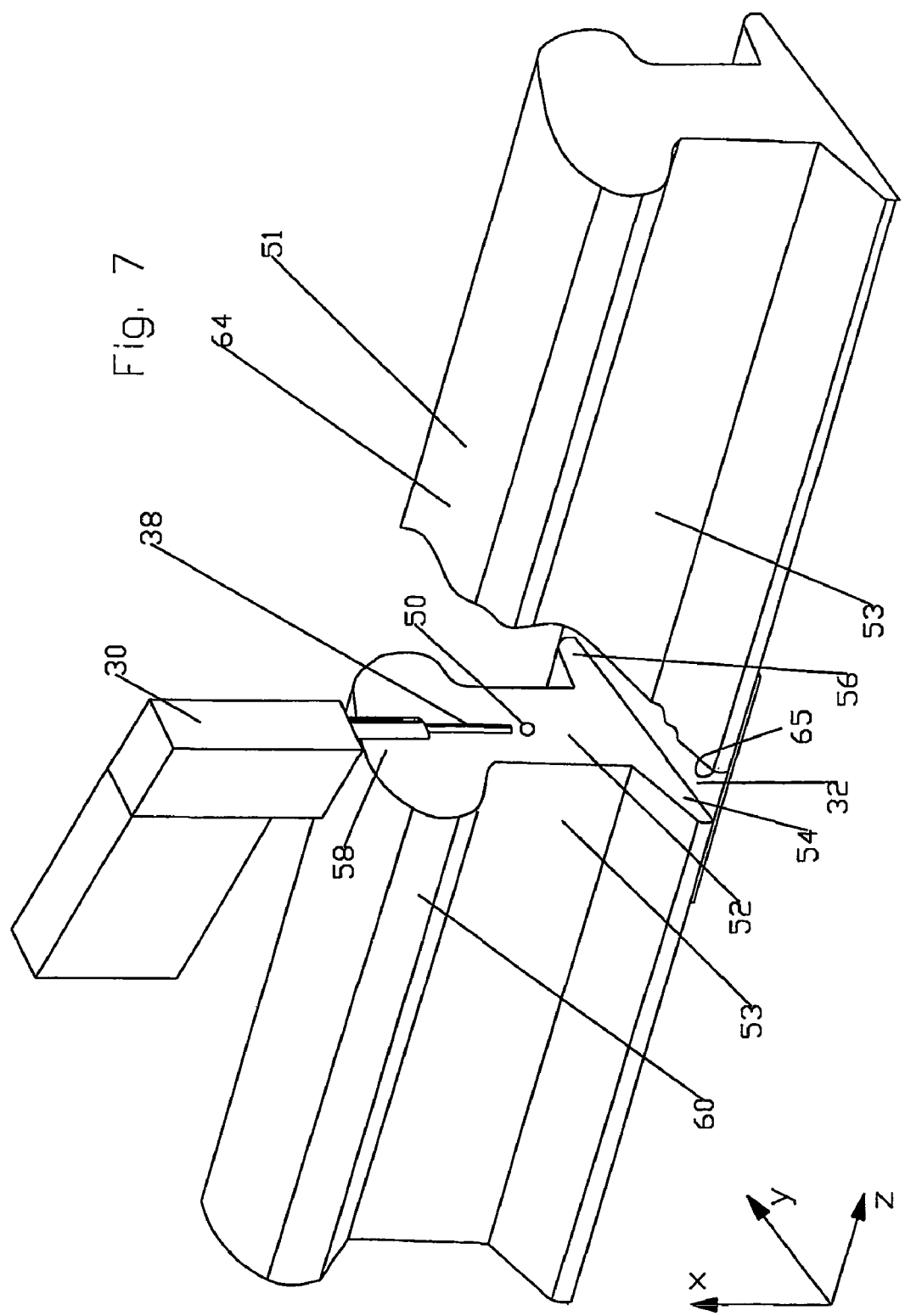

GAP WELDING PROCESS

CLAIM OF PRIORITY

Priority is claimed based on U.S. Provisional Application Ser. No. 60/209,040 filed Jun. 2, 2000.

STATEMENT OF INVENTORSHIP

Assignee Holland Company believes that the subject matter disclosed in FIG. 2 was the sole invention of Richard L. Thelen. Assignee Holland Company believes the subject matter in FIG. 3 was co-invented by Richard L. Thelen, James Mumaw of Lincoln Electric Company and Steve Sulc of Fanuc Robotics North America. That portion of FIG. 4 not specified as sole invention of Richard L. Thelen or co-invented by Richard L. Thelen, James Mumaw of Lincoln Electric Company and Steve Sulc of Fanuc Robotics North America was not invented by Richard L. Thelen and no rights therein will be claimed. These disclosures are made to comply with section 112 of 35 U.S.C. § 112.

GAP WELDING PROCESS

This proposed method and operation would electronically determine the location, orientation and size of the gap between two pieces that are to be welded together relative to the robotic welder's own coordinates. The gap welding process would adjust the predetermined welding coordinates to conform to the gap as presented, set the spatial association between the welder and the gap and then produce a sound weld.

BACKGROUND

During gas shielded arc welding of steel railroad rails in the field, difficulties have arisen in the past when the welding of gaps were reliant on the operators ability to position the pieces of rail to within the specified weld gap limitations. As in the case of on-site welding of large essentially immovable objects, positioning pieces of welding equipment to within the weld gap limitations can be very difficult or impossible to accomplish. Typically, robotic gas shielded arc welding has been very effective when welding is performed under controlled conditions, such as in a test laboratory, and the item to be welded can be brought to the stationary robotic welder and positioned to produce a weld gap that is within tolerance. On-site welding of large essentially immovable objects utilizing gas shielded arc welding has been ineffective until this point because of (1) the difficulties in positioning an easily transportable robotic arc welding device precisely with respect to the gap between two pieces to be welded when the pieces are stationary and repositioning is virtually impossible, (2) positioning the pieces to be welded precisely with respect to each other to define the weld gap to be welded by a nominal weld program is difficult and (3) the inability to accurately cut the faces of the pieces to be welded so that the geometrical planes created by the faces, that define the gap, are parallel to each other.

It was desirable to design a system that can sense the location and size of the gap between two pieces to be welded and automatically orient the gas arc welder to the proper location with respect to the gap to perform the welding function. It was also desirable to instantaneously gather information during the welding process to adjust data to allow the weld program to adapt to the weld gap. It was desirable to store the weld program data in a format that allows for easy manipulation of this data during the welding process. When automation is added, it is possible to properly align and modify the weld coordinates so a sound and accurate weld can be produced between two pieces.

SUMMARY OF INVENTION

The present invention provides a gap welding process that determines the location, orientation and shape of the gap between two pieces to be welded and then uses that information, along with data stored in spreadsheet format and feedback data to gas shield arc weld the gap. The preferred welding method is gas shield arc welding but electroslag welding may also be substituted into the gap welding process. The invention has three processes, the gap sensing process, the data transfer process and the robotic welding process which work simultaneously to produce a complete and accurate weld despite variations in the size and position of the weld gap.

The gap sensing process is designed to accurately measure the location and size of the gap to be welded and save the acquired information to allow the robotic control program to modify the program data. The gap sensing process utilizes a High Level Programming Language program to maneuver the robotic welder to touch specific locations on the faces and edges of the pieces forming the weld gap or ancillary fixturing to determine the weld gap's exact location, orientation and shape.

The data transfer process uses a data conversion program to (1) process welding data stored in files in a spreadsheet format, (2) convert the welding data into weld programming data and (3) make the weld program data available for use by the robotic control programs. The principle for the format of data stored in spreadsheet is relative to each of the user frames and alternation of the user frames as the welding process continues. The stored welding data includes, but is not limited to, point position, user frame to be used, weld schedule, seam tracking schedule, weave schedule, azimuth orientation, travel speed, wait time, weave time and digital output control data.

The gap welding process allows for the use of data from the gap sensing process to orient the welding torch to the proper coordinates for welding of the gap. It is further designed to compare weld program data provided by the data transfer process to current welding parameters in the form of feedback data to make welding calculations. The welding program then uses these calculations to determine subsequent weld process operations.

The robotic welding process uses data that has been downloaded into the robotic control program from the data transfer process, in the form of weld program data, to properly position the torch during welding. The robotic control program is written in a "Higher Level Programming Language". Data used by the robotic control program includes feedback data, weld variance data and weld program data. Feedback data are readings taken during the weld cycle of real time welding conditions.

With the gap sensing, data transfer, and robotic welding processes working together, the gap welding process can produce a complete and accurate weld despite variations in the location, orientation and shape of the weld gap.

BRIEF DESCRIPTION OF THE DRAWINGS

FIG. 7 is a perspective view of the weld gap.

DETAILED DESCRIPTION OF THE INVENTION

Several welding processes which have proven satisfactory in laboratory testing are unable to perform adequate welds in the field, as those taught in U.S. Pat. Nos. 5,773,779 and 5,877,468 which are incorporated by reference, because of a lack of adjustment and adaptability as provided by this gap welding process. It should also be understood that the invention here is applicable to robotic welding of any workpiece which is substantially immovable, however the principles are described with particular reference to rail welding. The prior art robotic calibration problem is a result of applying the typical method of robotic control such as one used in a manufacturing assembly line where work pieces are brought to a fixed welder. When the typical method of robotic control is used, which is one where the robotic welder is in a fixed location, the operator manually positions the robotic welder and pieces to be welded so the proper gap size is created. Once the pieces are properly positioned, fixed stops are used so subsequent pieces to be welded can be positioned in the exact location as the original. When using a fixed robotic welder, pieces to be welded have identical weld face orientation which is accomplished by the use of precise cutting methods and the ability of the operator to manually position the pieces so that the faces to be welded are parallel to each other.

When the robotic welder 30 is brought out into the field, each weld gap 32 encountered is unique from the next. To perform a weld, the robotic welder 30 needs to be moved to the next gap location and realigned. Due to the immovable nature of the weld pieces, the gap welding process 10 must sense the location, orientation and origin position of the faces of the pieces that define the gap and make adjustments to weld coordinate data so it can accurately and completely fill in the weld gap 32.

Figure 1:
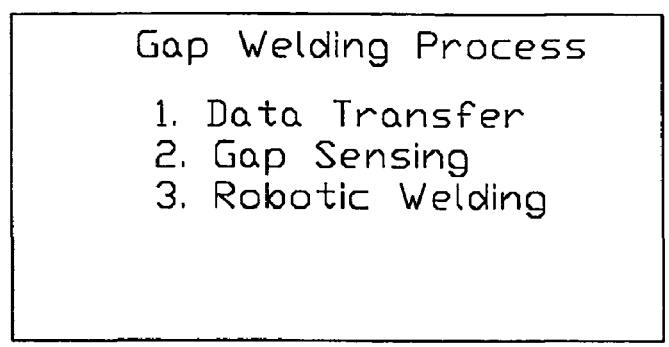
FIG. 1a is a table showing an overview of the steps in the gap welding process.
FIG. 1b is a flow diagram displaying an overview of the gap welding process.
Figure 1:
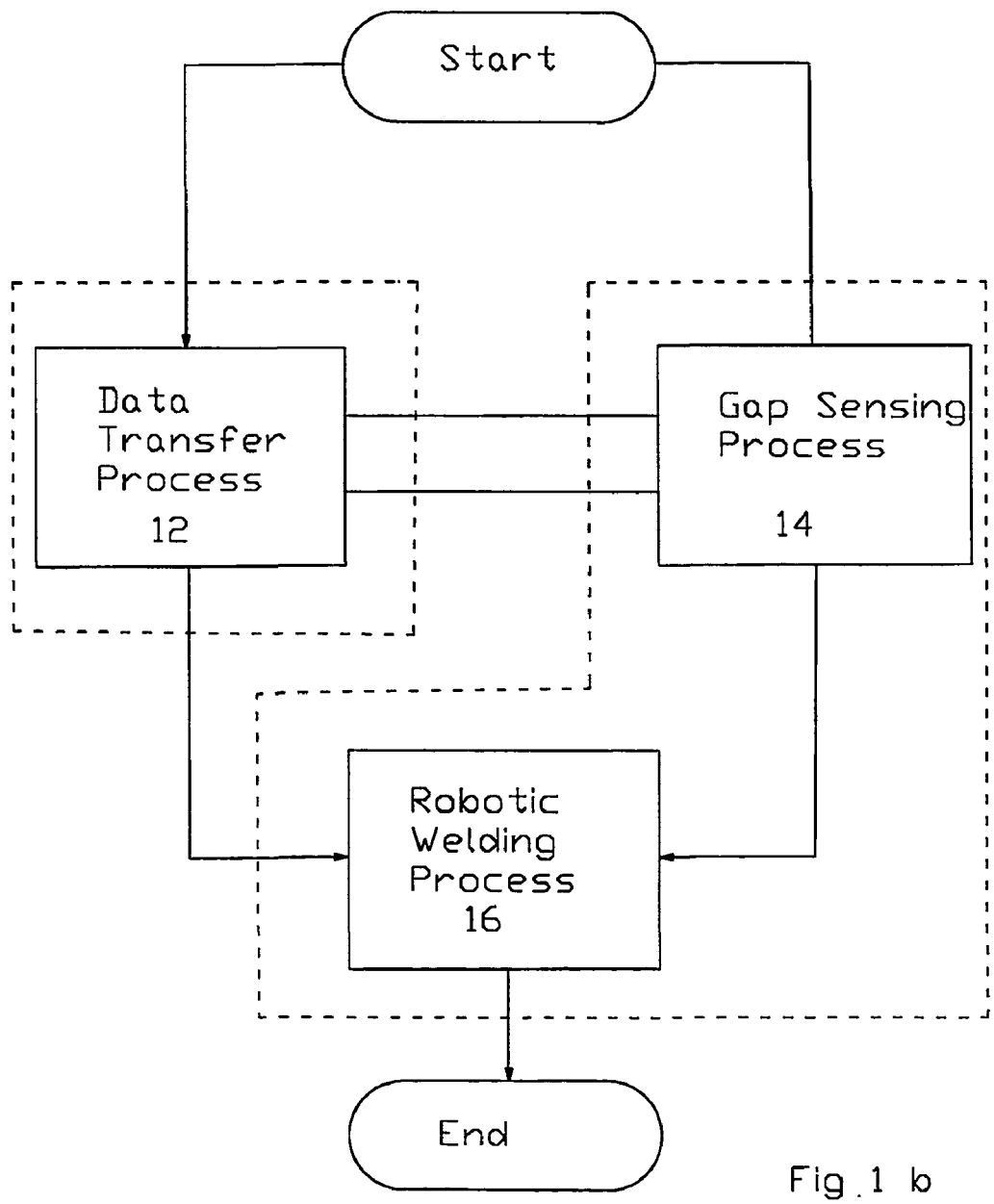

A preferred embodiment of the gap welding process 10 of the present invention is shown in the flow diagram of FIG. 1. The gap welding process 10 includes three processes that are needed to accurately and completely fill the weld gap 32 between two pieces 51 to be welded. The three processes include the data transfer process 12, the gap sensing process 14, and the robotic welding process 16. It will be understood that the problems are not necessarily unique to rail welding, as other on—site welds, such as in architectural construction, or ship-building, to name some examples, could also benefit from the teachings herein.

The gap welding process 10, which is made up of these several robotic control and sensing processes, is capable of welding a gap between two pieces of metal with variations in gap location, orientation and position. The advantages of the gap welding process 10 is the ability to locate the boundaries of the weld gap so the robotic control program 24 can continuously move the gas arc welding torch through the gap between the two pieces to be welded to properly produce a sound and accurate weld.

Figure 2:
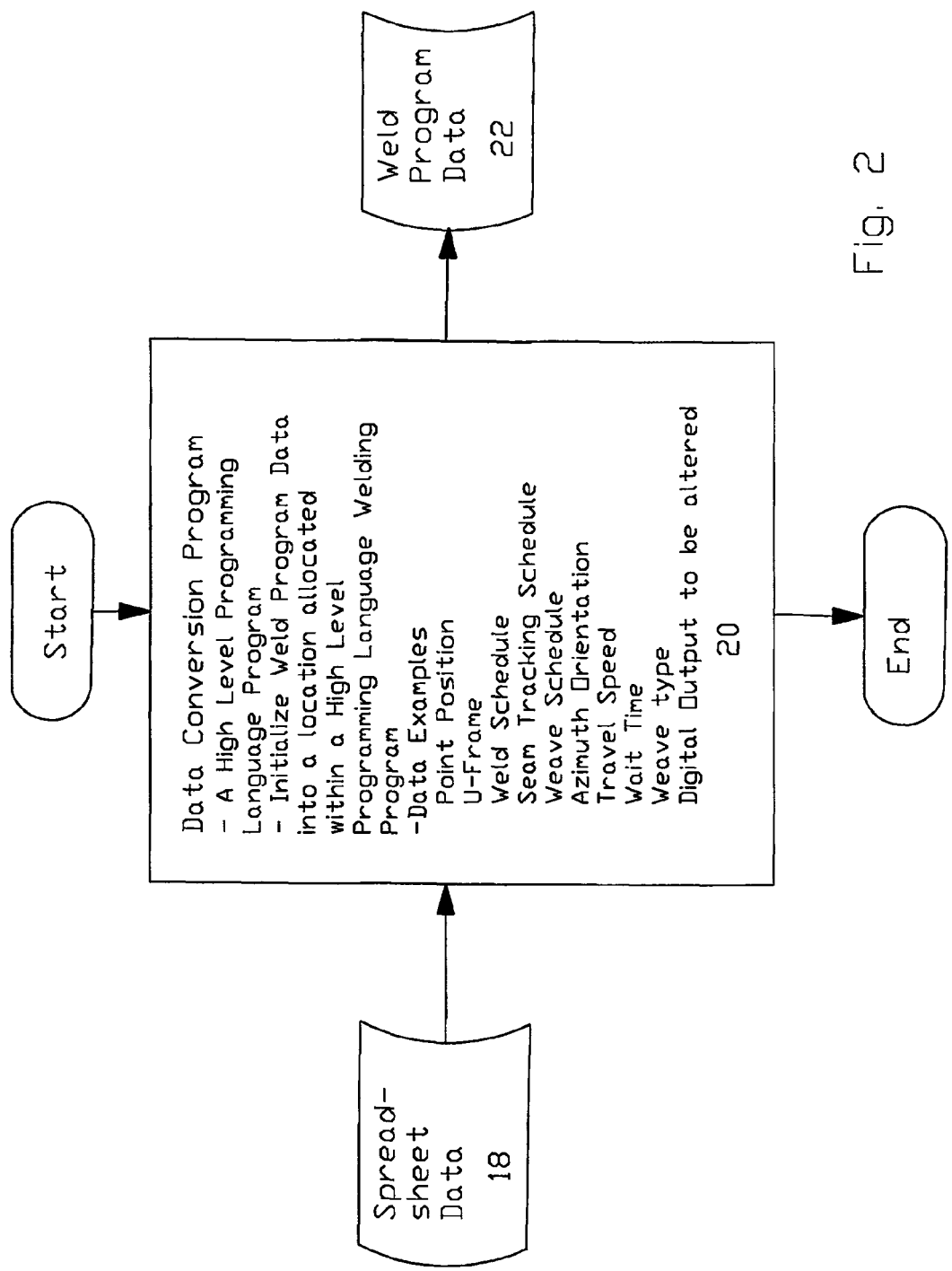
FIG. 2 is a flow diagram of the data download process with an expanded description of the properties of the data conversion program.

The gap welding process 10 is initiated with the transfer of weld data, which is performed by the data transfer process 12. The data transfer process 12, best shown in the flow diagram of FIG. 2, allows predetermined welding position data which is stored as spreadsheet data 18 to be converted into weld program data 22 by the data conversion program 20. The spreadsheet data 18 are stored information needed to instruct the robotic welder 30. The operator has the option of choosing a preselected group of spreadsheets or can create a customized group by selecting individual spreadsheet data 18. Other spreadsheet data can be substituted depending on the dimensions of the pieces to be welded. Once selected, the spreadsheet data 18 is converted by the data conversion program 20 to the weld program data 22 that can be used to position the robotic welder 30. The weld program data 22 contains variables in the X-Y-Z$^-$-W-P-R coordinate system that allows for three dimensional positioning and rotation of the robotic welder 30. The stored weld program data 22 also includes, but is not limited to, point position, user frame to be used, weld schedule, seam tracking schedule, weave schedule, azimuth orientation, travel speed, weave time and digital output control data. The data transfer process 12 allows for instantaneous transfer of weld program data 22 needed by the robotic control program 24 to perform a complete weld. The robotic control program can easily and automatically manipulate information stored in the weld program data. The data conversion program 20 is a Higher Level Programming Language program, which transfers the weld program data 22 into a program data memory location within a robotic control program 24. The weld program data 22 provides detailed information so the robotic control program 24 can accurately maneuver the robotic welder 30 in the weld gap 32 relative to the user frames that will be defined in the gap sensing process. The spreadsheet data 18 can be created or altered depending upon the object to be welded. Spreadsheets can be selected by the operator, as needed depending on the complexity or simplicity of the weld subject matter. The data transfer process 12 does not provides enough information for the robotic control program 24 to manipulate within a gap, additional physical data is required so the robotic control program 24 can conform to a specific weld gap 32. The process that provides the physical data is the gap sensing process 14.

Figure 3:
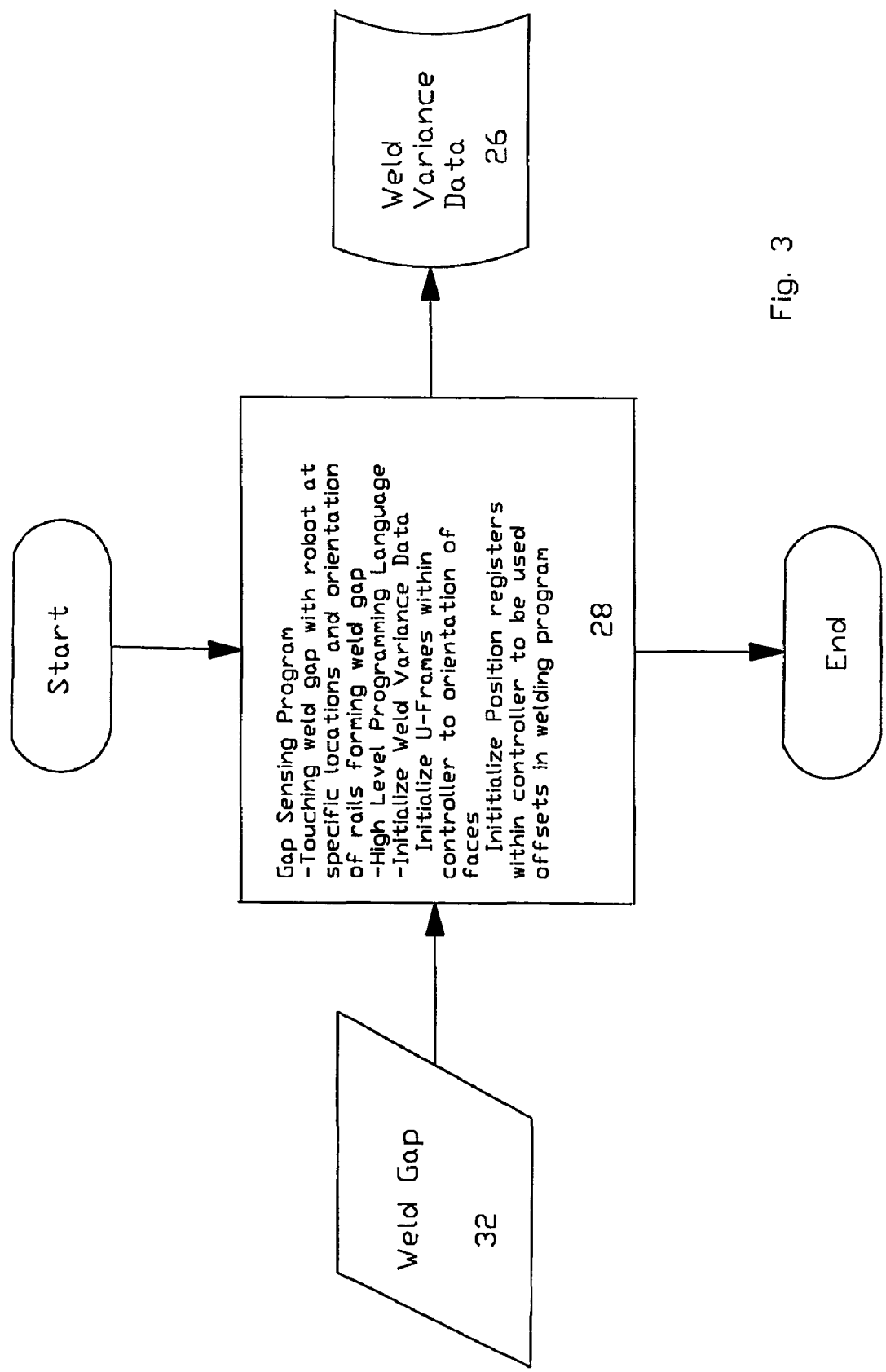
FIG. 3 is a flow diagram of the gap sensing process.

The gap sensing process 14, best shown in the flow diagram of FIG. 3, is designed to accurately measure the location, orientation and position of the gap 32 to be welded and store the acquired information as weld variance data 26 to be used by the robotic control program 24. Weld variance data 26 is made up of user frames 34 and offsets 36. User frames 36 are stored weld gap 32 data for the different weld face configurations. One geometrical plane of the User frames 36, determined by gap sensing, is formed by the face of the piece to be welded in relation to the coordinate position of the robotic welder 30. Offsets 36 are the measurements of the differences in actual dimension from the nominal dimension caused by manufacturing wear or handling, determined by the gap-sensing program 28 and used to make adjustments to weld program data. The gap sensing process 14 utilizes a gap sensing program 28 which is a "High Level Programming Language" program to maneuver the robotic welder 30 to touch the pieces to be welded which form the weld gap 32, to determine user frames 3 and 4 and offsets 36. The gap-sensing program 28 determines user frames to define the boundaries of the gap 32 to be welded.

Figure 4:
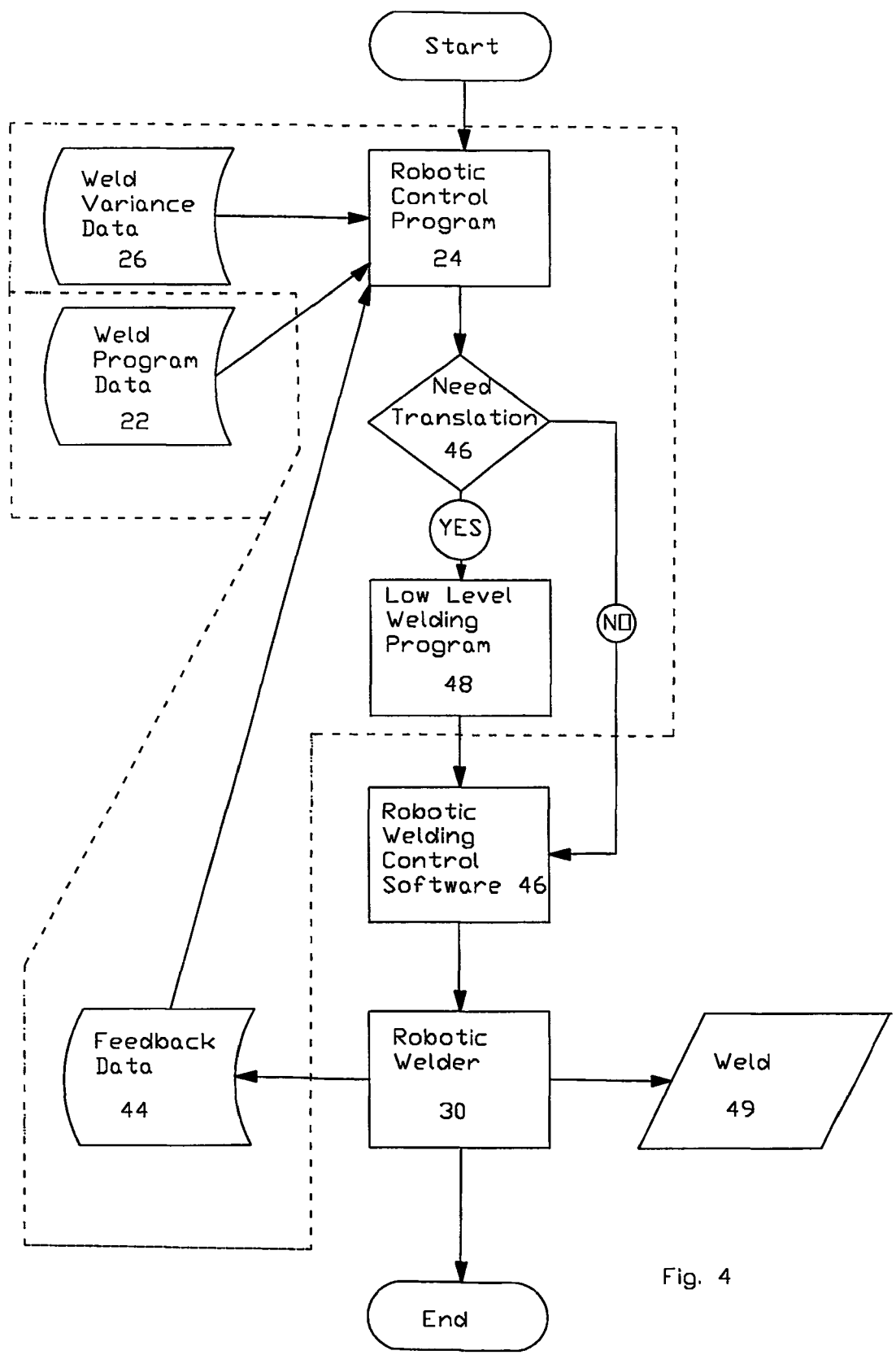
FIG. 4 is a flow diagram of the gap welding process incorporating weld program data, weld variance data and welding feedback data.
Figure 5:
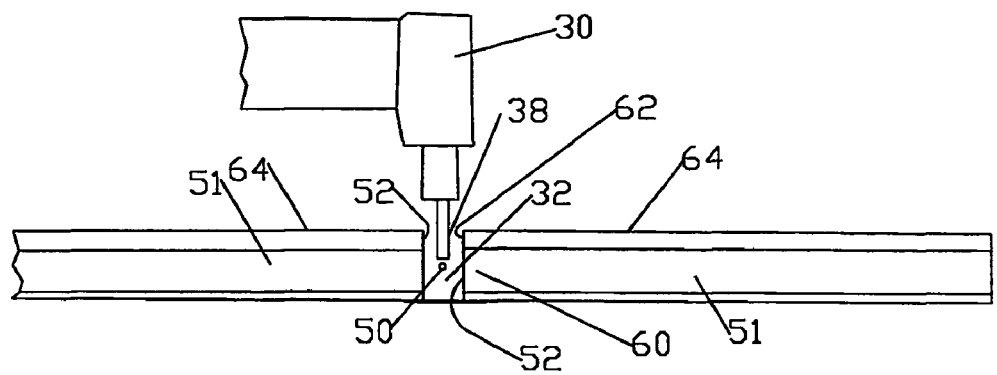
FIG. 5 is an elevational drawing of the robotic welder at the weld gap.
Figure 6:
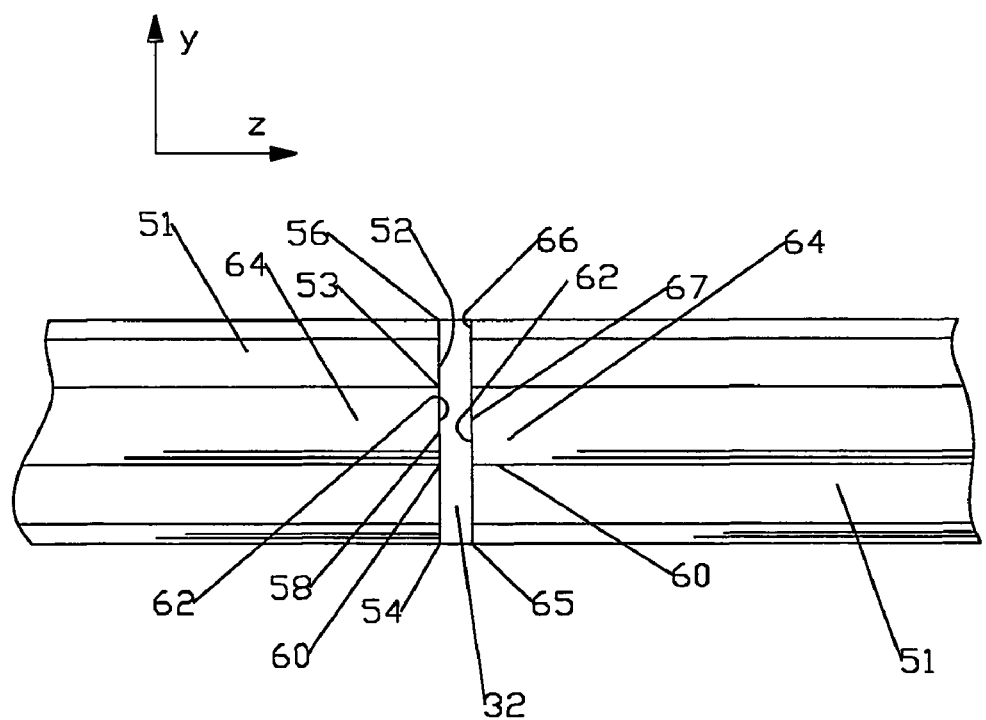
FIG. 6 is a top plan view of the weld gap.

The gap sensing process 14, as shown in FIG. 4, is initiated by placing the robotic welder 38 to within ¼ inch spherical proximity of a location 50 that has a relationship to the gap 32 formed by the pieces to be welded. It will be readily observed that FIGS. 5, 6 and 7 do not show this gap 32 to scale, being exaggerated for clarity. This orientation and location of the robot with respect to the gap 32 formed by the pieces to be welded is arbitrarily designated as User Frame 1. User Frame 1 is a relatively gross orientation and location between the robot and the gap to be welded and is used as the coordinate system for the start of the gap sensing process.

The arbitrary first user frame to be determined by the gap sensing program 28 is the geometrical face 52 of the piece to be welded, best shown in FIG. 7, which is closest to the robotic welder 30 and is arbitrarily designated as user frame 4. To determine the geometrical plane of user frame 4, and to determine orientation of the gap face within the plane, the gap sensing program 28 maneuvers the robotic welder 30 so the torch tip and/or weld wire 38 contacts the face 52 of the piece to be welded or the fixturing at several locations. The points of contact typically include the two bottom corner points 54 and 56 of the face, the top center point 58 along with other points, but many point combinations may be incorporated. The torch tip and/or weld wire 38 is electrically charged so when it comes into contact with the piece to be welded or fixturing, which is grounded, a circuit is completed. The gap-sensing program 28 senses the presence of a completed circuit and stops the robotic welder 30 and records its position in the X-Y-Z coordinate system. Once contact takes place, the robotic weld's 30 position is recorded and moved to the next location on the face until all needed points are gathered to determine user frame 4.

After collecting the points that make up user frame 4, the robotic welder 30 is instructed by the gap sensing program 28 to determine the next user frame. This is the face that opposes user frame 4 and is arbitrarily designated as user frame 3. To determine the geometrical plane of user frame 3, and to determine orientation of the gap face within that plane, the gap sensing program 28 maneuvers the robotic welder 30 so the torch tip and/or welding wire 38 contacts the face 52 of the piece to be welded or fixturing at several locations. The points of contact typically include the two bottom corner points 65 and 66 of the face, the top center point 67 along with other points, but many point combinations may be incorporated.

The operation of using the gap sensing program 28 to determine the geometrical plane of a user frame and orientation of the face of the piece to be welded within that plane is repeated until all necessary user frames have been defined and oriented.

Once the data points are gathered for all user frames, the robotic control program 24 calculates an arbitrarily chosen user frame 2, which is an imaginary geometrical plane which has a certain orientation to previously determined user frames. User frame 2 gives the robotic control program 24 a plane of reference when performing welding functions that are not oriented to a gap face. After gathering the necessary user frame data, the robotic control program 24 determines the gap offsets 36 of the pieces to be welded by positioning the torch tip and/or welding wire 38 to touch the outside 60, inside 62 and top 64 of the pieces to be welded to determine if any parts of the piece are offset in the X-Y-Z direction from the expected coordinates as represented in the weld program data 22. Offset determination is a crucial step in the gap welding process 10 because the weld program data 22 only provides the robotic control program 24 with the welding data for ideal weld gap conditions and does not compensate for dimensional variations in the pieces to be welded. When on-site welding, it is not uncommon to encounter material to be welded that has been deformed due to wear or other elemental factors such as manufacturing defects or damage due to improper handling. Offsets 36 as well as user frames are needed so the robotic control program 24 can vary the weld program data 22 to accurately conform to the weld gap 32. Weld variance data 26, which encompasses the user frames and offsets is used by the robotic control program 24 to determine whether the weld gap is within the allowable welding tolerance. If the weld gap 32 is larger or smaller than the acceptable tolerance limits, the robotic control program 24 will abort and no weld will be made.

The variance data allows the gap welding process 10 to be adapted to each individual weld gap 32. The gap sensing program 28, which uses a Higher Level Programming Language, uses the data received by physically touching the pieces to be welded to initialize the weld variance data 26. The initializing of the weld variance data 26 is when the gap sensing program 28 initializes the user frames to best fit the orientation of the weld gap 32, faces 52 and edges 53 and sets the offsets 36 to be used in the robotic welding process 10.

The robotic welding process 16, as shown in the flow diagram in FIG. 4, features the robotic control program 24 which receives input data in the form of weld variance data 26, weld program data 22 and feedback data 44. The robotic control program 24 uses the input data to determine where to position the robotic welder 30. The robotic control program 24 can manipulate the weld variance data 26 and the weld program data 22 based on information received from the real time feedback data 44 such as position and amperage. The manipulated data may be used by the robotic control program 24 to transmit computer instructions directly to the "Robotic Welding Control Software" 46 or due to differences in programming language, an instruction translation may be required. If a computer instruction translation is required to transform the High Level Programming Language instructions to Low Level Programming Language instruction, the robotic control program 24 can transmit the instructions to the Lower Level Welding Program 48 where the higher level welding program language instructions are converted into a format that can be understood by the Robotic Welding Control Software 46. It has been determined that the programming language known as KAREL is a suitable programming language for the invention described herein.

The Lower Level Welding Program 48 first receives instructions from the robot control program 24 and then the Lower Level Welding Program 48 written in a Low Level Programming Language is used as an Instruction Translating Program. The converted instructions are then transmitted from the Lower Level Welding Program 48 to the robotic welding control software that instructs the robotic welder 30 to properly position the welding torch and perform the appropriate operations, which produce a sound and accurate weld in the weld gap 32.

Various features of the invention have been particularly shown and described in connection with the illustrated embodiment of the invention, however, it must be understood that these particular arrangements merely illustrate, and that the invention is to be given its fullest interpretation.

In accordance with my invention, I claim:

1. A gap welding process for manipulating a movable robotic welder for making a weld between two or more substantially immovable work piece faces, the invention being operable as an intermediate step in conjunction with a gap-sensing routine for actual weld gap measuring by using the robotic welder to touch specific locations on pieces forming the gap or fixturing to produce weld variance data operably interfaced with a weld control program using weld variance data, and feedback data that is gathered during the welding process to determine and perform the correct manipulation required to produce torch movements to accurately weld the gap, the improvement comprising:

using a high level programming language to generate weld program data;

performing a data transfer routine which takes recorded data representing expected variables, runs a data conversion program that creates weld program data;

processing said data transfer and exporting same as said weld program data, thence further usable in the robotic control program;

said data including point position, user frames, weld schedule, seam tracking schedule, weave schedule, azimuth orientation, travel speed, wait time, weave type and number of digital output control data.

2. The weld program of claim 1 further comprising:
said recorded data being recorded in the form of spreadsheet data.

3. The weld program of claim 2 further comprising:
said weld program data contains variables in an X-Y-Z-W-P-R coordinate system.

4. The weld program of claim 2 further comprising:
storing as spreadsheet data information needed to instruct a robotic welder;
selecting spreadsheet data by performing one of the steps of
choosing a preselected group of spreadsheets or
creating a customized group by selecting individual spreadsheet data or substituting other spreadsheet data depending on the dimensions of the pieces to be welded.

5. The weld program of claim 4 further comprising:
said data conversion being performed in the high level programming language Karel.

6. The weld program of claim 5 further comprising:
said spreadsheet data representing prerecorded and measured variables for welding railroad rails.

* * * * *